US011153822B2

(12) United States Patent
Wong et al.

(10) Patent No.: US 11,153,822 B2
(45) Date of Patent: Oct. 19, 2021

(54) TELECOMMUNICATIONS APPARATUS AND METHODS TO TRANSMIT WAKE-UP SIGNAL COMPRISING SYNCHRONISATION SIGNALLING

(71) Applicants: Sony Corporation, Tokyo (JP); Sony Mobile Communications Inc., Tokyo (JP)

(72) Inventors: Shin Horng Wong, Basingstoke (GB); Martin Warwick Beale, Basingstoke (GB); Brian Alexander Martin, Basingstoke (GB); Basuki Priyanto, Basingstoke (GB); Nafiseh Mazloum, Basingstoke (GB)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 77 days.

(21) Appl. No.: 16/610,530

(22) PCT Filed: May 3, 2018

(86) PCT No.: PCT/EP2018/061301
§ 371 (c)(1),
(2) Date: Nov. 4, 2019

(87) PCT Pub. No.: WO2018/202751
PCT Pub. Date: Nov. 8, 2018

(65) Prior Publication Data
US 2020/0059862 A1    Feb. 20, 2020

(30) Foreign Application Priority Data

May 4, 2017  (EP) ..................................... 17169577

(51) Int. Cl.
*H04W 76/28* (2018.01)
*H04W 76/27* (2018.01)
(Continued)

(52) U.S. Cl.
CPC ..... *H04W 52/0229* (2013.01); *H04W 52/028* (2013.01); *H04W 52/0216* (2013.01);
(Continued)

(58) Field of Classification Search
CPC ......... H04W 52/0216; H04W 52/0229; H04W 52/028; H04W 56/001; H04W 68/025; H04W 76/27; H04W 76/28
See application file for complete search history.

(56) References Cited

U.S. PATENT DOCUMENTS

| 2011/0150252 A1* | 6/2011 | Solum | H04L 7/0008 |
| | | | 381/314 |
| 2012/0275366 A1* | 11/2012 | Anderson | H04W 68/025 |
| | | | 370/311 |

(Continued)

OTHER PUBLICATIONS

International Search Report and Written Opinion dated Aug. 8, 2018, for PCT/EP2018/061301 filed on May 3, 2018, 13 pages.
(Continued)

*Primary Examiner* — Brian P Cox
(74) *Attorney, Agent, or Firm* — Xsensus LLP

(57) ABSTRACT

A method of operating a network access node in a wireless telecommunications system comprising the network access node and a terminal device, wherein the method comprises: establishing that a downlink message, e.g. a paging message, for the terminal device to decode is going to be transmitted by the network access node; and transmitting wake-up signalling to the terminal device in advance of transmitting the downlink message to provide the terminal device with an indication the downlink message for the terminal device is going to be transmitted, wherein the wake-up signalling (Continued)

comprises an indication of an amount of synchronisation signalling for use by the terminal device to achieve radio synchronisation with the network access node, wherein the amount of synchronisation signalling depends on an amount of time elapsed since the terminal device was previously radio synchronised to the network access node.

18 Claims, 5 Drawing Sheets

(51) Int. Cl.
  *H04W 52/02* (2009.01)
  *H04W 56/00* (2009.01)
  *H04W 68/02* (2009.01)
(52) U.S. Cl.
  CPC ....... *H04W 56/001* (2013.01); *H04W 68/025* (2013.01); *H04W 76/27* (2018.02); *H04W 76/28* (2018.02)

(56) References Cited

U.S. PATENT DOCUMENTS

| | | | | |
|---|---|---|---|---|
| 2014/0198696 | A1* | 7/2014 | Li | H04W 52/0229 370/311 |
| 2014/0211678 | A1 | 7/2014 | Jafarian et al. | |
| 2014/0321381 | A1* | 10/2014 | Guo | H04W 52/0216 370/329 |
| 2016/0142974 | A1* | 5/2016 | Lindoff | H04W 52/0209 370/311 |
| 2016/0270135 | A1* | 9/2016 | Lim | H04L 5/16 |
| 2016/0374022 | A1 | 12/2016 | Ang et al. | |

OTHER PUBLICATIONS

Xiaomi Communications, "Considerations on paging design," 3GPP TSG RAN WG1 Meeting No. 88, R1-1703230, Athens, Greece, Feb. 13-17, 2017, Retrieved from the Internet URL: http://www.3gpp.org/ftp/Meetings_3GPP_SYNC/RAN1/Docs/ on Feb. 12, 2017, 2 pages.

Ericsson, "Revised WID for Further Enhancement MTC for LTE", 3GPP TSG-RAN Meeting #73, RP-161464, Sep. 19-22, 2016, New Orleans, USA, Total 6 pages.

Huawei, HiSilicon, "Revised work item proposal: Enhancements of NB-IoT", 3GPP TSG RAN Meeting #75, RP-161901, Sep. 19-22, 2016, New Orleans, USA, Total 8 pages.

Ericsson, Qualcomm, "New WID on Even further enhanced MTC for LTE", 3GPP TSG RAN Meeting #73, RP-170732, Mar. 6-9, 2017, Dubrovnik, Croatia, Total 4 pages.

Christian Hambeck et al., "A 2.4μW Wake-up Receiver for Wireless Sensor Nodes with -71dBm Sensitivity", IEEE Proceeding International Symposium of Circuits and Systems (ISCAS), 2011, pp. 534-537.

Huawei, HiSilicon, Neul, "New WID on Further NB-IoT enhancements", #3GPP TSG RAN Meeting #75, RP-170852, Mar. 6-9, 2017, Dubrovnik, Croatia, Total 6 pages.

3GPP, "LTE; Evolved Universal Terrestrial Radio Access (E-UTRA); User Equipment (UE) procedures in idle mode", 3GPP TS 36.304 version 14.2.0 Release 14, Apr. 2017, pp. 1-51.

3GPP, "Evolved Universal Terrestrial Radio Access (E-UTRA); Medium Access Control (MAC) protocol specification", 3GPP TS 36.321 version 13.5.0 Release 13, Apr. 2017, pp. 1-96.

Sadok Bdiri, et al., "An 868MHz 7.5μW wake-up receiver with -60dBm sensitivity", Journal of Sensors and Sensor Systems, published by Copernicus Publications on behalf of the AMA Association for Sensor Technology, Dec. 22, 2016, pp. 434-446.

Nafiseh Seyed Mazloum et al., "Performance Analysis and Energy Optimization of Wake-Up Receiver Schemes for Wireless Low-Power Applications", Lund University, IEEE Transactions on Wireless Communications, Dec. 2014, pp. 1-12.

Holma, H. et al., "LTE for UMTS: OFDMA and SC-FDMA Based Radio Access", System Architecture Based 3GPP SAE, John Wiley & Sons, Ltd., 2009, 4 pages.

Seyed Mazloum, "Duty-cycled Wake-up Schemes for Ultra-low Power Wireless Communications", Ph.D. dissertation, Lund University, Department of Electrical and Information Technology, May 2016, 233 pages.

* cited by examiner

TELECOMMUNICATIONS APPARATUS AND METHODS TO TRANSMIT WAKE-UP SIGNAL COMPRISING SYNCHRONISATION SIGNALLING

CROSS-REFERENCE TO RELATED APPLICATIONS

The present application is based on PCT filing PCT/EP2018/061301, filed May 3, 2018, which claims priority to EP 17169577.8, filed May 4, 2017, the entire contents of each are incorporated herein by reference.

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

Future wireless communications networks will be expected to routinely and efficiently support communications with a wider range of devices associated with a wider range of data traffic profiles and types than current systems are optimised to support. For example it is expected future wireless communications networks will be expected to efficiently support communications with devices including reduced complexity devices, machine type communication (MTC) devices, high resolution video displays, virtual reality headsets and so on. Some of these different types of devices may be deployed in very large numbers, for example low complexity devices for supporting the "The Internet of Things", and may typically be associated with the transmissions of relatively small amounts of data with relatively high latency tolerance.

In view of this there is expected to be a desire for future wireless communications networks, for example those which may be referred to as 5G or new radio (NR) system/new radio access technology (RAT) systems, as well as future iterations/releases of existing systems, to efficiently support connectivity for a wide range of devices associated with different applications and different characteristic data traffic profiles.

One example area of current interest in this regard includes the so-called "The Internet of Things", or IoT for short. The 3GPP has proposed in Release 13 of the 3GPP specifications to develop technologies for supporting narrowband (NB)-IoT and so-called enhanced MTC (eMTC) operation using a LTE/4G wireless access interface and wireless infrastructure. More recently there have been proposals to build on these ideas in Release 14 of the 3GPP specifications with so-called enhanced NB-IoT (eNB-IoT) and further enhanced MTC (feMTC), and in Release 15 of the 3GPP specifications with so-called further enhanced NB-IoT (feNB-IoT) and even further enhanced MTC (efeMTC). See, for example, [1], [2], [3], [4]. At least some devices making use of these technologies are expected to be low complexity and inexpensive devices requiring relatively infrequent communication of relatively low bandwidth data.

The increasing use of different types of terminal devices associated with different traffic profiles gives rise to new challenges for efficiently handling communications in wireless telecommunications systems that need to be addressed.

SUMMARY

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
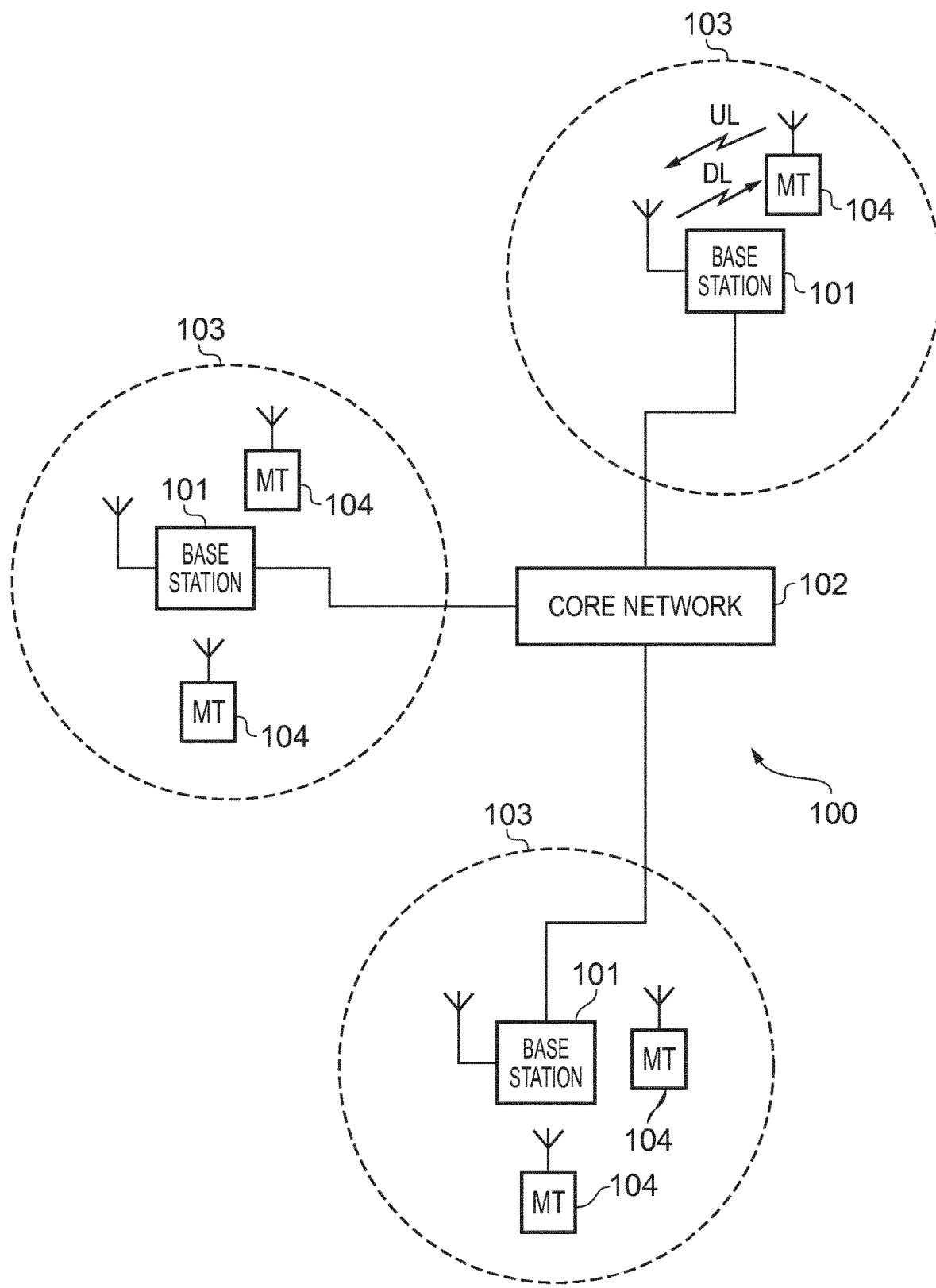
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment/network access node, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
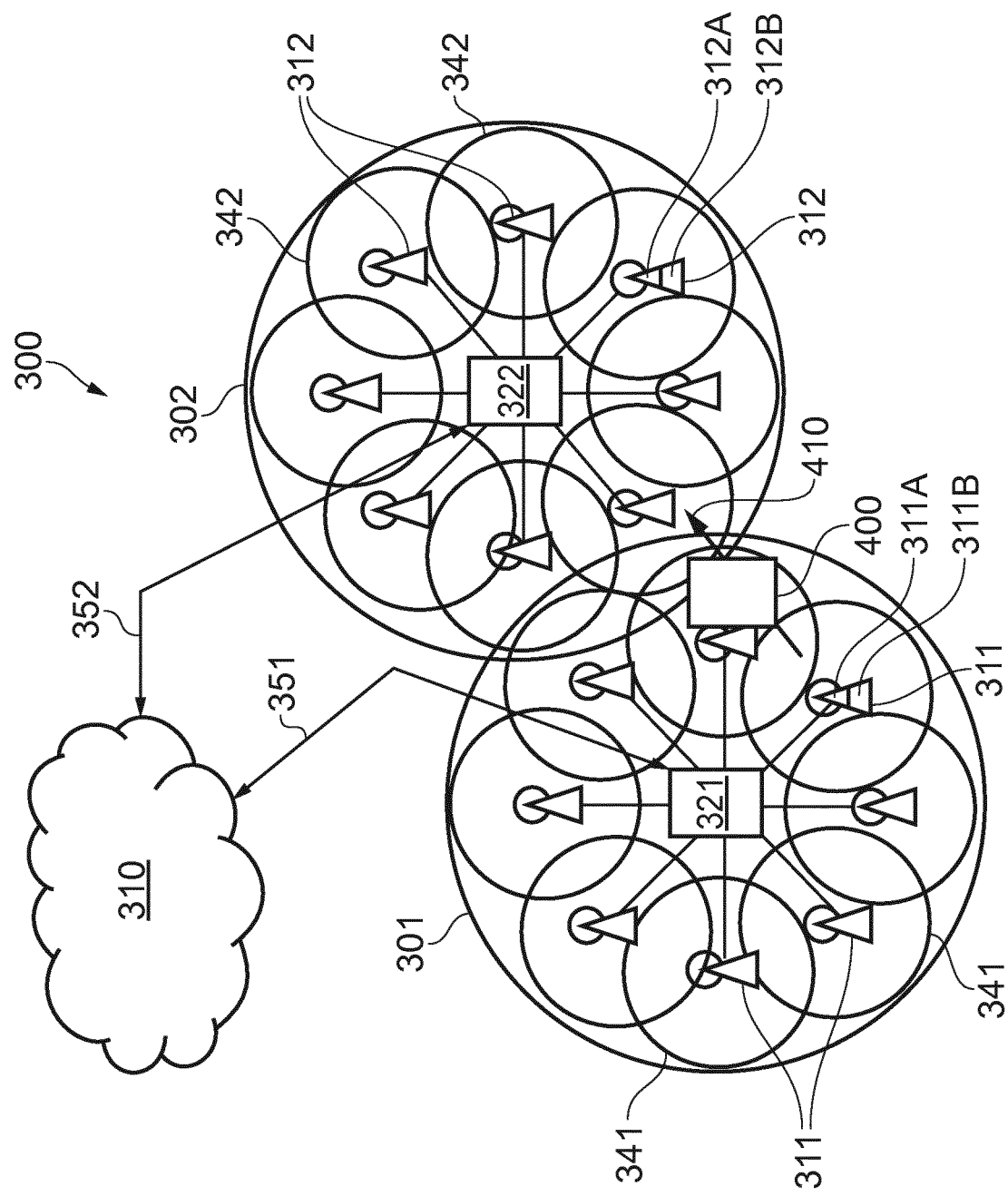
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new RAT wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311a, 312a for transmission and reception of wireless signals and processor circuitry 311a, 311b configured to control the respective distributed units 311, 312.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated in some other implementations communications associated with a given terminal device may be routed through more than one distributed unit, for example in a soft handover scenario and other scenarios. The particular distributed unit(s) through which a terminal device is currently connected through to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

For a terminal device in RRC idle mode the core network is aware that the terminal device is present within the network, but the radio access network (RAN) part (comprising radio network infrastructure equipment such as the base stations 101 of FIG. 1 and/or the combined TRPs/CUs of FIG. 2) is not. The core network is aware of the location of idle mode terminal devices at a paging tracking area level but not at the level of individual transceiver entities. The core network will generally assume a terminal device is located within the tracking area(s) associated with a transceiver entity most recently used for communicating with the terminal device, unless the terminal device has since provided a specific tracking area update (TAU) to the network. (As is conventional, idle mode terminal devices are typically required to send a TAU when they detect they have entered a different tracking area to allow the core network to keep track of their location.) Because the core network tracks terminal devices at a tracking area level, it is generally not possible for the network infrastructure to know which specific transceiver entities (radio network node) to use when seeking to initiate contact with a terminal device in idle mode. Consequently, and as is well known, when a core network is required to connect to an idle mode terminal device a paging procedure is used.

In a typical currently deployed network, idle mode terminal devices are configured to monitor for paging messages periodically. For terminal devices operating in a discontinuous reception (DRX) mode this occurs when they wake up for their DRX awake time. Paging signals for a specific terminal device are transmitted in defined frames (Paging Frames)/sub-frames (Paging Occasions) which for a given terminal device may be derived from the International Mobile Subscriber Identifier (IMSI) of the terminal device, as well as paging related DRX parameters established in system information transmitted within the network.

In a conventional system, a terminal device thus receives and checks the contents of specific sub-frames (paging occasions) in specific frames (paging frames) to look for paging signalling. For example, in accordance with the standards set out in 3GPP TS 36.304 version 14.2.0 Release 14 [6], a Paging Frame (PF) is a downlink radio frame which may contain one or more Paging Occasion(s) (PO), where a Paging Occasion is a sub-frame where there may be P-RNTI transmitted on PDCCH (or equivalent depending channel on implementation, e.g. MPDCCH or for NB-IOT on NPDCCH) addressing the paging message. Paging messages are conveyed on a physical downlink shared channel (PDSCH) on resources identified from an allocation message addressed to a paging radio network temporary identifier (P-RNTI) and conveyed on a physical downlink control channel (PDCCH). P-RNTI is a common identifier for all terminal devices (e.g. set at FFFE in hexa-decimal for the standard defined by 3GPP TS 36.321 version 13.5.0 Release 13 [7]). All terminal devices check whether PDCCH at specific PFs/POs configured for their use include P-RNTI or not. If there is a PDSCH allocation addressed to P-RNTI in the relevant subframe, the terminal device proceeds to seek to receive and decode the paging messages transmitted on the allocated resources on PDSCH. The UE then checks the list of IDs contained in the paging record list in the received paging message, to determine whether the list contains an ID corresponding to itself (for example P-TMSI or IMSI), and if so initiates a paging response.

Although the above description has summarised an example existing LTE paging procedure, it is expected that broadly similar principles may be adopted for future wireless telecommunications networks based on newer radio access technologies (RATs), such as 5G networks. The above-description of a paging procedure has referred to specific channel names which are commonly used in LTE, such as PDCCH and PDSCH, and this terminology will be used throughout this description for convenience, it being appreciated that in certain implementations different channel names may be more common. For example in the context of a wireless telecommunications system having dedicated channels for communicating with certain types of terminal device, for example MTC devices, it may be expected the corresponding channel names may be modified. For example, a physical downlink control channel dedicated for MTC devices may be referred to as MPDCCH and a corresponding physical downlink shared channel for MTC devices may be referred to as MPDSCH.

In proposed approaches for eNB-IoT and feMTC in accordance with 3GPP release 14 a terminal device in DRX in idle mode is required to decode PDCCH (or equivalent downlink control channel for the specific implementation at hand) to identify if there are resources scheduled on PDSCH (or equivalent downlink shared channel for the specific implementation at hand) for a paging message during paging occasions in which the terminal device might receive a paging message.

Figure 3:
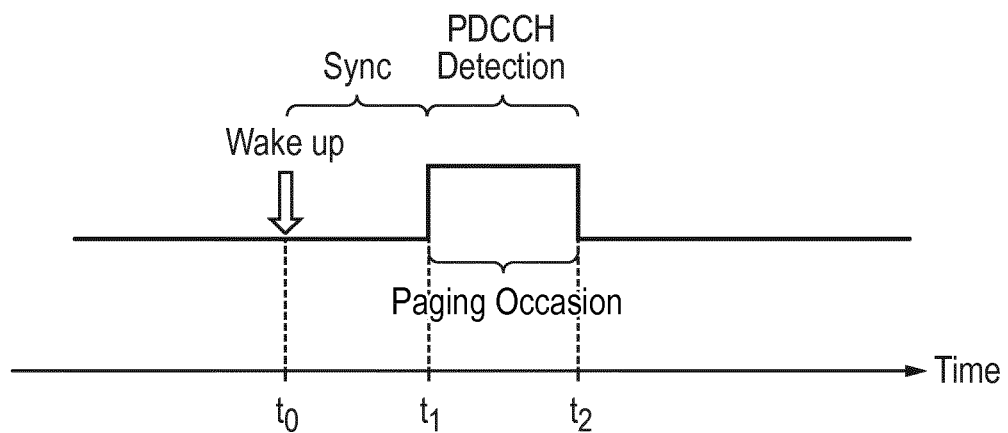
FIGS. 3 and 4 schematically represent time lines associated with paging occasions in wireless telecommunication systems based on known approaches.

FIG. 3 schematically represents a timeline of a paging occasion for a terminal device operating in a known wireless telecommunications system. In the example shown in FIG. 3, one paging occasion is shown and extends from time t1 to t2. As is conventional, paging occasions for a terminal device will typically occur according to a regular repeating schedule having regard to the terminal device's currently configured DRX cycle. Different terminal devices may have different DRX cycle lengths, and so have different times between paging occasions. For a terminal device having a relatively long DRX cycle/time between paging occasions, it is possible the terminal device will to some extent lose synchronisation with the radio network infrastructure equipment of the telecommunications system between paging occasions. In this case it may be helpful for the terminal device to wake up in advance of the paging occasion to allow it to synchronise to the wireless telecommunications system prior to the paging occasion. An example of this is schematically shown in FIG. 3 in which the terminal device wakes up at time t0 so that it can synchronise with the wireless telecommunication system in the period between times t0 and t1 so that it is able to monitor/detect PDCCH during the configured paging occasion between t1 and t2. In this regard, the process of synchronisation might in some cases only require fine adjustments to frequency and/or timing tracking loops based on detection of CRS (cell-specific reference symbols), e.g. when DRX cycles (times between paging occasions) are relatively short, or a more significant degree synchronisation may be needed, for example complete re-synchronisation by detecting PSS/SSS (primary synchronisation signals/secondary synchronisation signals) as well as using CRS, e.g. when DRX cycles (times between paging occasions) are relatively long (such that the frequency and timing of the terminal device may become significantly offset relative to that of the radio network infrastructure).

Once the terminal device has re-synchronised to the network, it will monitor PDCCH to determine if there is a paging message, and if so will go on to decode the PDSCH carrying the paging message in the usual way. If there is no paging message for the terminal device, the terminal device will go back to sleep (low power mode) until the next paging occasion. For certain types of terminal device, such as MTC devices, it may be expected paging will occur relatively rarely (e.g. once per day for a smart utility meter), and so in many cases the terminal device may wake up and synchronise to the network to monitor PDCCH by blind decoding for a paging message when in fact there is no paging message for the terminal device. This represents an undesirable "waste" of resources, for example battery power, for the terminal device.

Proposed approaches for eNB-IoT and feMTC in accordance with 3GPP release 15 share several common objectives, and one of these objectives is to reduce power consumption associated with monitoring for paging massages by introducing what is referred to as a wake-up signal (WUS) (e.g. of the type described in C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537 [8]). The proposed WUS is carried on a new physical channel and is intended to allow terminal devices to determine whether or not they need to actually decode PDCCH in an upcoming paging occasion. That is to say, whereas in accordance with previously proposed techniques a terminal device is required to decode PDCCH during every paging occasion to determine if there is a paging message, and if so to decode PDSCH to determine if the paging message is addressed to the terminal device, the WUS is instead intended to indicate to the terminal device whether or not the next paging occasion contains a paging message that the terminal device should decode. A WUS is transmitted at a pre-determined/derivable time in advance of a scheduled paging occasion such that a terminal device knows when to seek to receive a WUS and may contain relatively little information so that it can be decoded quickly (as compared to the blind decoding needed for PDCCH). For example, in some implementations the WUS may include a one-bit indication of whether or not there will be a paging message transmitted in the upcoming paging occasion. If the WUS indicates the upcoming paging occasion does include a paging message, any terminal devices for which that paging occasion applies may proceed to decode the paging message as normal to determine if the paging message is addressed to it. If the WUS indicates the upcoming paging occasion does include any paging message, any terminal device for which that paging occasion applies can determine from this that it does not need to monitor for a paging message during the upcoming paging occasion, and so can, for example, return to a low power mode. In some implementations the WUS may include an identifier for a terminal device that is going to be paged in the paging occasion. This identifier may identify an individual terminal device or may identify a group of terminal devices. The WUS may include multiple identifiers for multiple terminal devices/groups. A terminal device which determines the WUS is associated with an identifier that applies to it may proceed to decode the paging message as normal. Conversely, a terminal device which determines the WUS is not associated with an identifier that applies to it may determine from this that it does not need to monitor for a paging message during the upcoming paging occasion and can, for example, return to a low power mode. The WUS may also be encoded with a format that enables low power decoding (e.g. the WUS may be a narrow bandwidth signal that can be decoded with low power using a low sampling rate receiver), and furthermore may be transmitted with a format that allows reliable decoding even with relatively poor synchronisation.

Figure 4:
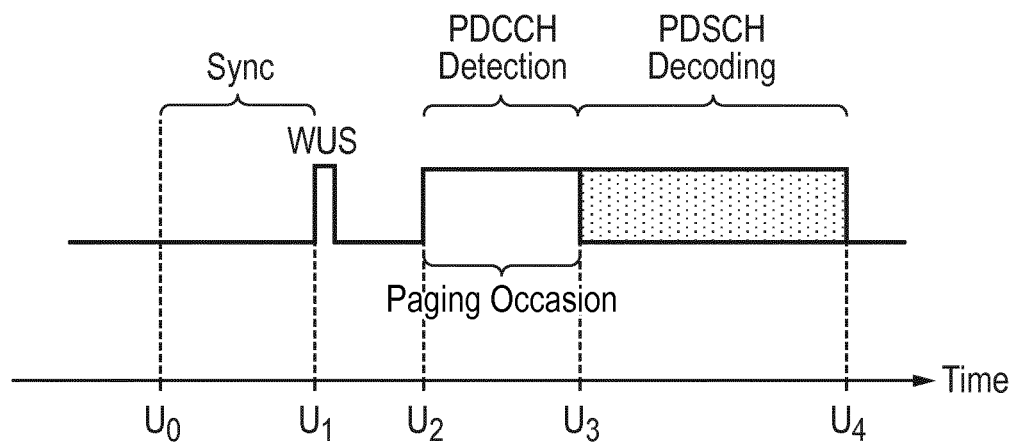

FIG. 4 schematically represents a timeline for a paging occasion for a terminal device operating in a wireless telecommunications system employing a WUS as proposed in association with 3GPP Release 15. In the example shown in FIG. 4, a paging occasion extends from time u2 to u3. As is conventional, the paging occasions will typically occur according to a regular repeating schedule having regard to the terminal device's currently configured DRX cycle.

As schematically indicated in FIG. 4, a WUS is transmitted at a predetermined/derivable time u1 in advance of the paging occasion to indicate there is a PDCCH paging message transmission for a terminal device indicated by an identifier associated with the WUS (the identifier could identify an individual terminal device or a group of terminal devices). If the paging occasion is not scheduled to include a PDCCH paging message transmission for a terminal device, then a WUS identifying that terminal device is not sent. Thus a terminal device may be configured to seek to detect a WUS associated with an identifier for the terminal device in advance of an upcoming paging occasion. If the terminal device detects a WUS associated with an identifier for itself, the terminal device can proceed to fine tune its frequency and timing tracking loops if required and blind detects for a PDCCH between times u2 and u3, followed by decoding of the PDSCH carrying the paging message between time u3 and u4 in the usual way.

If, however, the terminal device fails to detect a WUS associated with an identifier for the terminal device, the terminal device may assume there is not going to be a paging message for the terminal device in the upcoming paging occasion, and so may go back to sleep (low power mode) and not decode PDCCH in the paging occasion. As noted above, in some other implementations, the WUS might not include any indication of any specific terminal device(s)/group(s), but may instead simply include an indication of whether or not an upcoming paging occasion includes any paging message. Either way, by using WUS, a terminal device may be expected to consume less energy as it can help avoid unnecessary monitoring/blind decoding of PDCCH (or equivalent depending on the specific implementation at hand). It will be appreciated that WUS can also be used in connected mode when DRX is used.

If a terminal device is configured for a long DRX cycle (i.e. a relatively long time between paging occasions), there may be a significant likelihood the terminal device will lose synchronisation with the radio access network so that it is unable to decode WUS without first synchronising to the radio access network. An example of this is schematically shown in FIG. 4 whereby a terminal device configured for a relatively long DRX cycle may need to wake up at time u0 to allow time for it to synchronise to the radio access network before u1 so that it can detect any WUS signalling. Current proposals for feMTC synchronisation rely on using PSS/SSS in the same way as for LTE. Because PSS/SSS signalling is typically relatively sparse, e.g. only twice per radio frame in LTE, a terminal device needing to synchronise to the network using this general synchronisation signalling is required to start doing so a relatively long time in advance of an expected WUS occasion. This is exacerbated for terminal devices relying on coverage enhancement techniques for reliable communications because of poor radio coverage (e.g. because the terminal device is located in a basement), since coverage enhancement techniques typically rely on aggregating repeat transmissions, meaning the terminal device needs to wake up even sooner to receive a sufficient number of the transmissions before an expected WUS occasion. This can mean terminal devices configured for relatively long DRX cycles can consume relatively large amounts of energy at each paging occasion even when using WUS.

To help address this issue with existing schemes relying on general synchronisation signalling, such as PSS/SSS in an LTE context, which is transmitted relatively infrequently, it has been proposed to transmit additional synchronisation signalling in association with WUS signalling. See, for example, N. S. Mazloum, O. Edfors, "Performance Analysis and Energy Optimization of Wake-Up Receiver Schemes for Wireless Low-Power Applications", IEEE Transaction on Wireless Communications, December 2014 [9]. In particular, it has been proposed to transmit WUS signalling with synchronisation signalling (e.g. a predetermined/derivable preamble/signature sequence) that can be used by terminal devices to synchronise to the network, for example using conventional correlator techniques.

Figure 5:
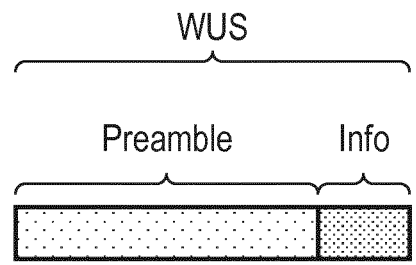
FIG. 5 schematically represents an example format for wake up signalling (WUS) that may be adapted for use in accordance with certain embodiments of the disclosure.

FIG. 5 schematically represents an example format for wake up signals (WUS) that include a synchronisation preamble (predefined signature sequence) and which may be used in accordance with certain embodiments of the disclosure. Thus the WUS represented in FIG. 5 comprises a preamble part and an information ("Info") part. The preamble part comprises signalling for terminal devices to use to achieve synchronisation with the network (i.e. with the radio network infrastructure equipment transmitting the WUS). The information part comprises an indication of one or more terminal devices to which the WUS applies, e.g. a terminal device identifier and/or an identifier for a group of terminal devices. The terminal device/group identifier(s) may be network allocated identifiers (e.g. radio network temporary identifiers, RNTI) for the terminal device(s), or any other form of suitable identifier, e.g. based on an IMSI for a terminal device.

By providing additional/dedicated synchronisation signalling in association with the WUS, a terminal device may achieve synchronisation with the network using this additional synchronisation signalling transmitted contemporaneously with/around the same time as the WUS, rather than needing to rely on existing general synchronisation signalling, which may be transmitted relatively infrequently in the wireless telecommunications system and so require the terminal device to exit a low power/sleep mode or an extended duration to achieve synchronisation to monitor for WUS signalling.

Figure 6:
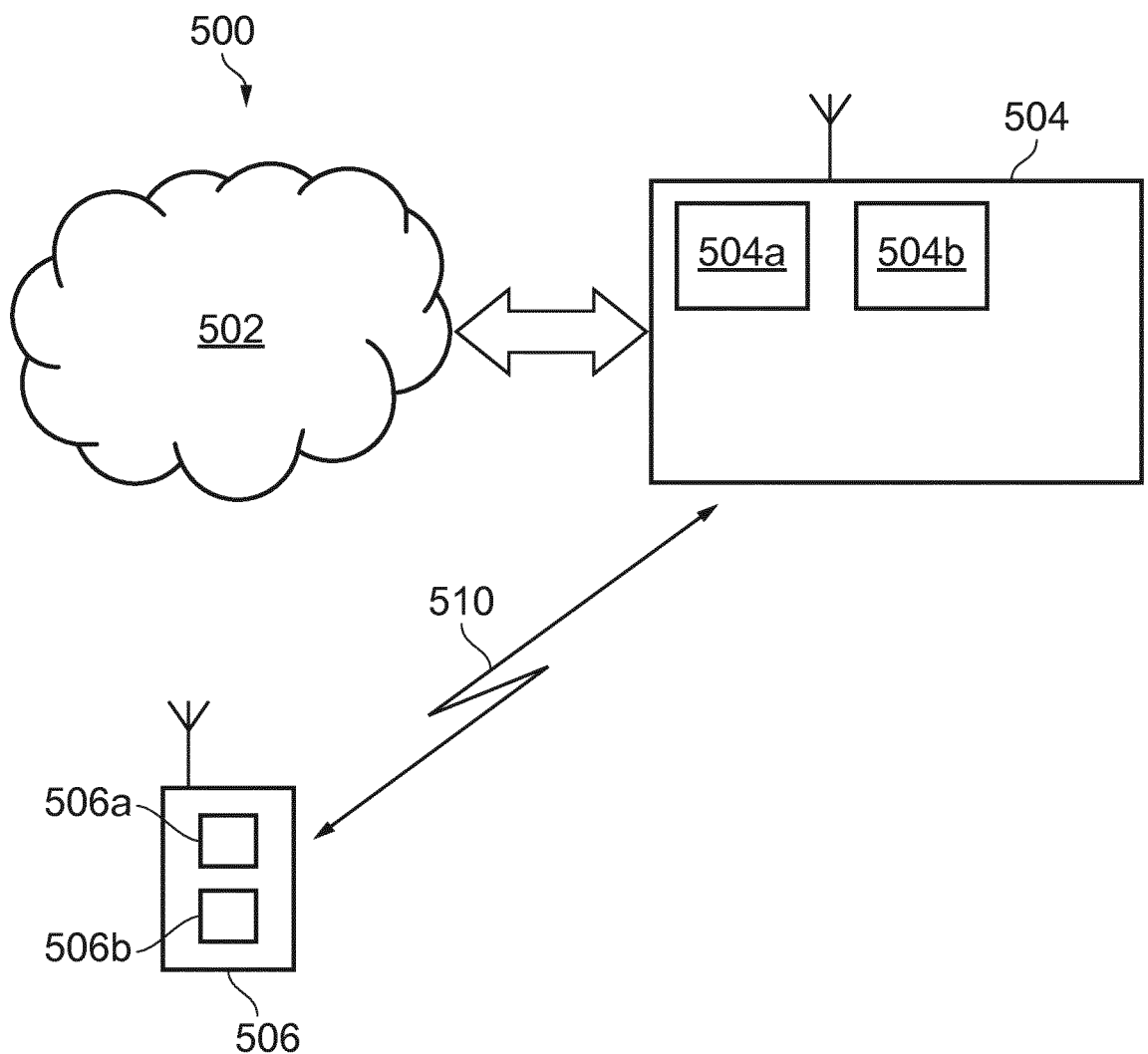
FIG. 6 schematically represents some aspects of a wireless telecommunication system in accordance with certain embodiments of the present disclosure.

FIG. 6 schematically shows some aspects of a telecommunications system 500 configured to support communications between a terminal device 506 and a network access node 504 in accordance with certain embodiments of the disclosure. Many aspects of the operation of the telecommunications system/network 500 are known and understood and are not described here in detail in the interest of brevity. Aspects of the architecture and operation of the telecommunications system 500 which are not specifically described herein may be implemented in accordance with any previously proposed techniques, for example according to current 3GPP standards and other proposals for operating wireless telecommunications systems/networks. The network access node 504 may, for convenience, sometimes be referred to herein as a base station 504, it being understood this term is used for simplicity and is not intended to imply the network access node should conform to any specific network architecture, but on the contrary, may correspond with any network infrastructure equipment/network access node that may be configured to provide functionality as described herein. In that sense it will appreciated the specific network architecture in which embodiments of the disclosure may be implemented is not of primary significance to the principles described herein.

The telecommunications system 500 comprises a core network part (evolved packet core) 502 coupled to a radio network part. The radio network part comprises the radio network access node (e.g. network access node in an LTE implementation) 504 coupled to the terminal device 506. It will of course be appreciated that in practice the radio network part may comprise a plurality of network access nodes serving a larger number of terminal devices across various communication cells. However, only a single network access node and one terminal device are shown in FIG. 6 in the interests of simplicity.

As with a conventional mobile radio network, the terminal device 506 is arranged to communicate data to and from the network access node (transceiver station/network infrastructure equipment) 504. The network access node is in turn communicatively connected to a serving gateway, S-GW, (not shown) in the core network part which is arranged to perform routing and management of mobile communications services to the terminal devices in the telecommunications system 500 via the network access node 504. In order to maintain mobility management and connectivity, the core network part 502 also includes a mobility management entity (not shown) which manages the enhanced packet service, EPS, connections with terminal devices operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 6 may be in accordance with known techniques apart from where modified to provide functionality in accordance with embodiments of the present disclosure as discussed herein.

In this example the terminal device 506 is assumed to be an MTC terminal device adapted to use DRX with a relatively long cycle time (i.e. a relatively long period between wake ups). The terminal device 506 may be a dedicated MTC terminal device, such as a smart meter device, or may be a generic terminal device, such as a smartphone terminal device, running an application that relies on MTC data exchange. The terminal device 506 comprises transceiver circuitry 506a (which may also be referred to as a transceiver/transceiver unit) for transmission and reception of wireless signals and processor circuitry 506b (which may also be referred to as a processor/processor unit) configured to control the terminal device 506. The processor circuitry 506b may comprise various sub-units/sub-circuits for providing desired functionality as explained further herein. These sub-units may be implemented as discrete hardware elements or as appropriately configured functions of the processor circuitry. Thus the processor circuitry 506b may comprise circuitry which is suitably configured/programmed to provide the desired functionality described herein using conventional programming/configuration techniques for equipment in wireless telecommunications systems. The transceiver circuitry 506a and the processor circuitry 506b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the terminal device 506 will in general comprise various other elements associated with its operating functionality, for example a power source, user interface, and so forth, but these are not shown in FIG. 6 in the interests of simplicity.

The network access node 504 comprises transceiver circuitry 504a (which may also be referred to as a transceiver/transceiver unit) for transmission and reception of wireless signals and processor circuitry 504b (which may also be referred to as a processor/processor unit) configured to control the network access node 504 to operate in accordance with embodiments of the present disclosure as described herein. The processor circuitry 504b may again comprise various sub-units, such as a scheduling unit, for providing functionality in accordance with embodiments of the present disclosure as explained further below. These sub-units may be implemented as discrete hardware elements or as appropriately configured functions of the processor circuitry. Thus, the processor circuitry 504b may comprise circuitry which is suitably configured/programmed to provide the desired functionality described herein using conventional programming/configuration techniques for equipment in wireless telecommunications systems. The transceiver circuitry 504a and the processor circuitry 504b are schematically shown in FIG. 6 as separate elements for ease of representation. However, it will be appreciated that the functionality of these circuitry elements can be provided in various different ways, for example using one or more suitably programmed programmable computer(s), or one or more suitably configured application-specific integrated circuit(s)/circuitry/chip(s)/chipset(s). It will be appreciated the network access node 504 will in general comprise various other elements associated with its operating functionality, such as a scheduler. For example, although not shown in FIG. 6 for simplicity, the processor circuitry 504b may comprise scheduling circuitry, that is to say the processor circuitry 504b may be configured/programmed to provide the scheduling function for the network access node.

Thus, the network access node 504 is configured to communicate with the terminal device 506 over a radio communication link 510.

As noted above, it has been previously proposed to transmit WUS signalling with a preamble sequence that can be used by a terminal device to achieve synchronisation to a network, e.g. correlator techniques [5]. This can help the terminal device synchronise to the network so that it can establish the information content in the WUS (i.e. the indication as to whether an upcoming paging occasion will include a paging message for the terminal device) without needing to rely on existing relatively infrequently transmitted general synchronisation signalling in the wireless telecommunications system. Certain embodiments of the disclosure are based on a modification of this approach. In particular, certain embodiments of the disclosure are based on approaches in which the amount of synchronisation signalling transmitted in association with a wake up signal transmitted by a network access node to indicate a terminal device is going to receive a paging message is variable, for example it may depend on an amount of time that has elapsed since the terminal device was last synchronised to the network access node. Thus, wake up signalling for a terminal device configured with a relatively long DRX cycle may be associated with a greater amount of synchronisation signalling than wake up signalling for a terminal device configured with a shorter DRX cycle. This can help ensure different terminal devices receive sufficient synchronisation signalling to allow them to synchronise to the network to receive wake up signalling, while helping reduce the overall amount of resources used in the wireless telecommunication system for synchronisation signalling associated with wake-up signalling.

Thus, certain embodiments of the disclosure provide methods of operation in a wireless telecommunications system comprising a network access node and a terminal device in which the network access node transmits wake-up signalling to the terminal device in advance of transmitting a paging message to provide the terminal device with an indication the paging message for the terminal device is going to be transmitted, wherein the wake-up signalling comprises an indication of an identifier for the terminal device (e.g. by identifying the individual terminal device or a group of terminal devices on which the individual terminal device is a member) and an amount of synchronisation signalling (e.g. a predetermined preamble/signature sequence) for use by the terminal device to achieve radio synchronisation with the network access node, wherein the amount of synchronisation signalling (e.g. preamble/signature sequence length/number of bits) depends on an amount of time elapsed since the terminal device previously achieved/had radio synchronisation with the network access node. In this regard it will be appreciated certain embodiments of the disclosure represent a development of previously proposed WUS schemes, such as discussed above, and aspects and features of approaches in accordance with embodiments of the disclosure which correspond with aspects and features of existing WUS proposals, for example in terms of determining when WUS signalling is transmitted, may be based on existing proposals.

The amount of time elapsed since the terminal device previously achieved radio synchronisation with the network access node may, for example, be taken to correspond to an amount of time associated with a repeat period for a discontinuous reception mode (e.g. corresponding to the repeat period itself or the duration of the DRX sleep part of the repeat period). In another example the amount of time elapsed since the terminal device previously achieved radio synchronisation with the network access node may be taken to correspond to an amount of time since the terminal device previously monitored for or received data from the network access node on a downlink control channel (e.g. PDCCH, or equivalent depending on implementation) and/or a downlink shared channel (e.g. PDSCH, or equivalent depending on implementation).

Thus certain embodiments of the disclosure may be broadly summarised as modified approaches for using wake-up signalling to indicate whether a terminal device should proceed to seek to decode a paging message in which a characteristic of the wake-up signalling, for example, an amount of synchronisation signalling transmitted in association with the wake-up signalling, is dependent upon a currently configured DRX length for the terminal device. This recognises that terminal devices have an increased likelihood of losing synchronisation after a longer DRX sleep period, and hence in some cases it may be helpful for wake-up signalling to include synchronisation signalling to allow the terminal device to synchronise to the network without needing to detect general synchronisation signalling transmitted in the network, such as PSS/SSS in an LTE context, which is typically transmitted relatively infrequently (sparsely distributed). However, if the DRX duration for a terminal device is relatively short, it may be expected the terminal device will retain synchronisation so that it is not necessary to transmit any, or as much, additional synchronisation signalling in association with the wake-up signalling.

The format for wake-up signalling in accordance with certain embodiments of the disclosure may thus follow the general approach set out in FIG. 5, except the length of the preamble may be varied depending on the extent to which the terminal device is likely to have lost synchronisation with the network (i.e. depending on the amount of time elapsed since the terminal device last synchronised to the network). In cases where the elapsed time is relatively short, the preamble may, in effect, have zero length (i.e. there may be no synchronisation signalling sent in association with wake-up signalling for short DRX). Apart from the variable amount of synchronisation signalling, the wake-up signalling may generally conform with previously proposed techniques, for example in terms of how and when it may be transmitted and what other information it may contain (for example, the nature and format of identifiers for the terminal device(s) to which the wake-up signalling applies).

Thus in certain embodiments of the disclosure, the WUS characteristic which depends on the extent to which the terminal device is likely to have lost synchronisation/time elapsed since the terminal device was last synchronised to the network may be the length of a preamble of the kind represented in FIG. 5. That is to say, the portion of the signal used for synchronisation (the preamble) may have a length which is greater for a terminal device configured for a long DRX cycle than for a terminal device configured for a short DRX cycle.

For example, in some implementations a first amount of synchronisation signalling may be associated with a WUS if it is determined an amount of time elapsed since the terminal device previously achieved radio synchronisation with the relevant network access node is less than a threshold time period and a second amount of synchronisation signalling may be associated with a WUS if it is determined an amount of time elapsed since the terminal device previously achieved radio synchronisation with the network access node is equal to or more than the threshold time period, wherein the second amount of synchronisation signalling is greater than the first amount of synchronisation signalling (e.g. has a longer preamble).

The first amount of synchronisation signalling may be zero (e.g. no preamble/preamble length 0 ms) such that if the time since the terminal device was last synchronised (e.g. DRX cycle duration) is greater than the threshold time period (a typical value for which may be around 200 ms), a non-zero amount of synchronisation signalling (e.g. a preamble length of around 1 ms for a terminal device in normal coverage and around 100 ms for a terminal device with deep coverage enhancement) is associated with the wake-up signalling, whereas if the time since the terminal device was last synchronised is less than the threshold time period, no additional synchronisation signalling is transmitted in association with the wake-up signalling. For example, in one implementation, a terminal device in idle mode may be configured with a relatively long DRX that exceeds the threshold time period and hence it would expect to monitor for a preamble (synchronisation signalling) when seeking to receive wake-up signalling, whereas when the terminal device enters connected mode, it may be configured with a different DRX setting, which may have a length shorter than the threshold time period, and so the terminal device would then not expect, or seek to decode, a synchronisation preamble transmitted in conjunction with the WUS. The threshold time period may be selected based on the expected time for which the terminal device may be expected to be able to retain a sufficient degree of synchronisation using its own internal clock to allow it to receive signalling from the network without needing additional synchronisation signalling.

It will be appreciated in some implementations there may be more than two different amounts of synchronisation signalling that may be selected for transmission in association with WUS. For example, in one embodiment, a set of progressively longer available preamble lengths may be defined e.g. {L1, L2, L3, L4} and a preamble length may be selected form the set based on a corresponding set of DRX cycle length thresholds, e.g. {D1, D2, D3}. For example if the DRX cycle is shorter than D1, the preamble length L1 may be selected (which may be zero). If the DRX cycle is equal to or greater than D1, but less than D2, the preamble length L2 may be selected. If the DRX cycle is equal to or greater than D2, but less than D3, the preamble length L3 may be selected. If the DRX cycle is equal to or greater than D3, the preamble length L4 may be selected. Appropriate values for the thresholds and preamble lengths will depend on the implementation at hand, for example having regard to the degree of synchronisation required to successfully receive data in the network, and the accuracy of the terminal devices internal clocks.

The DRX length threshold(s) associated with different amounts of synchronisation signalling may be defined in an operating standard for the wireless telecommunications systems, or may be selectable by the network and communicated to the terminal devices, for example in association with the system information broadcast (SIB) and/or radio resource control (RRC) signalling. This can allow the terminal device to determine the amount of synchronisation signalling that will be transmitted in association with the wake-up signalling which may facilitate the synchronisation process for the terminal device. However, it will be appreciated in other implementations a blind-decoding technique may be used.

In general, the specific techniques used by the terminal device to achieve synchronisation using the synchronisation signalling may be based on conventional techniques (for example using a correlator).

In some implementations, in addition to, or instead of, taking account of the amount of time elapsed since the terminal device previously achieved radio synchronisation with the network access node to determine the amount of synchronisation signalling (e.g. preamble length), the amount of synchronisation signalling may depend on other characteristics associated with the terminal device.

For example, in some implementations the amount of synchronisation signalling may depend on radio channel conditions between the network access node and the terminal device. For example, if it is determined the terminal device is associated with relatively poor channel conditions, for example because the terminal device is classified as a terminal device requiring coverage enhancement, a greater amount of synchronisation signalling may be used. In particular, for a terminal device classified as requiring coverage enhancement, the synchronisation signalling may comprise a number of repeats of a preamble signature sequence to provide the terminal device with a greater chance of achieving synchronisation. In another example, the amount of synchronisation signalling transmitted in association wake-up signalling may depend on measurements of radio channel conditions, e.g. a received power or quality of reference symbols, when the terminal device was previously synchronised to the network. For a terminal device associated with relatively poor channel conditions/in need of a relatively high amount of coverage enhancement, a greater number of repeats of a preamble signature sequence may be used as synchronisation signalling. Thus, in some cases, the length of a preamble for a WUS may be dependent upon a coverage level the WUS is targeting. A longer preamble may be used for a terminal device requiring coverage enhancement as compared to terminal devices in good coverage. A preamble may be repeated multiple times where the degree of repetition is dependent upon the coverage of the terminal device.

As noted above, an amount of synchronisation signalling transmitted in association wake-up signalling may depend on radio channel conditions instead of, or in addition, to depending on an amount of time elapsed since the terminal device previously achieved radio synchronisation with the network access node. Thus some embodiments provide a method of operating a network access node, as well as a network access node and corresponding circuitry, in a wireless telecommunications system comprising the network access node and a terminal device, wherein the method comprises: establishing that a downlink message for the terminal device to decode is going to be transmitted by the network access node; and transmitting wake-up signalling to the terminal device in advance of transmitting the downlink message to provide the terminal device with an indication the downlink message for the terminal device to decode is going to be transmitted, wherein the wake-up signalling comprises an indication of an amount of synchronisation signalling for use by the terminal device to achieve radio synchronisation with the network access node, wherein the amount of synchronisation signalling depends on a characteristic of radio channel conditions between the terminal device and the network access node. Similarly, from the perspective of the terminal device, some embodiments provide a method of operating a terminal device, as well as a terminal device and corresponding circuitry, in a wireless telecommunications system comprising the terminal device and a network access node, wherein the method comprises: receiving wake-up signalling transmitted to the terminal device by the network access node to provide the terminal device with an indication a downlink message for the terminal device to decode is going to be transmitted, wherein the wake-up signalling comprises an indication of an amount of synchronisation signalling for use by the terminal device to achieve radio synchronisation with the network access node, wherein the amount of synchronisation signalling depends on a characteristic of radio channel conditions between the terminal device and the network access node.

In some other implementations the amount of synchronisation signalling associated with a given elapsed time since last synchronisation may take account of a characteristic of a timing clock for the terminal device. For example, if a terminal device is associated with a relatively high precision internal clock (the clock precision may be communicated to the network access node as capability information, for example in a prior radio resource connection process), a smaller amount of synchronisation signalling may be transmitted in association with wake-up signalling for this terminal device as compared to another terminal device having a lower quality clock for the same DRX cycle length.

Again, an amount of synchronisation signalling transmitted in association wake-up signalling may depend on a characteristic of a timing clock for the terminal device instead of, or in addition, to depending on an amount of time elapsed since the terminal device previously achieved radio synchronisation with the network access node. Thus some embodiments provide a method of operating a network access node, as well as a network access node and corresponding circuitry, in a wireless telecommunications system comprising the network access node and a terminal device, wherein the method comprises: establishing that a downlink message for the terminal device to decode is going to be transmitted by the network access node; and transmitting wake-up signalling to the terminal device in advance of transmitting the downlink message to provide the terminal device with an indication the downlink message for the terminal device to decode is going to be transmitted, wherein the wake-up signalling comprises an amount of synchronisation signalling for use by the terminal device to achieve radio synchronisation with the network access node, wherein the amount of synchronisation signalling depends on a characteristic of a timing clock for the terminal device. Similarly, from the perspective of the terminal device, some embodiments provide a method of operating a terminal device, as well as a terminal device and corresponding circuitry, in a wireless telecommunications system comprising the terminal device and a network access node, wherein the method comprises: receiving wake-up signalling transmitted to the terminal device by the network access node to provide the terminal device with an indication a downlink message for the terminal device to decode is going to be transmitted, wherein the wake-up signalling comprises an amount of synchronisation signalling for use by the terminal device to achieve radio synchronisation with the network access node, wherein the amount of synchronisation signalling depends on a characteristic of a timing clock for the terminal device.

Figure 7:
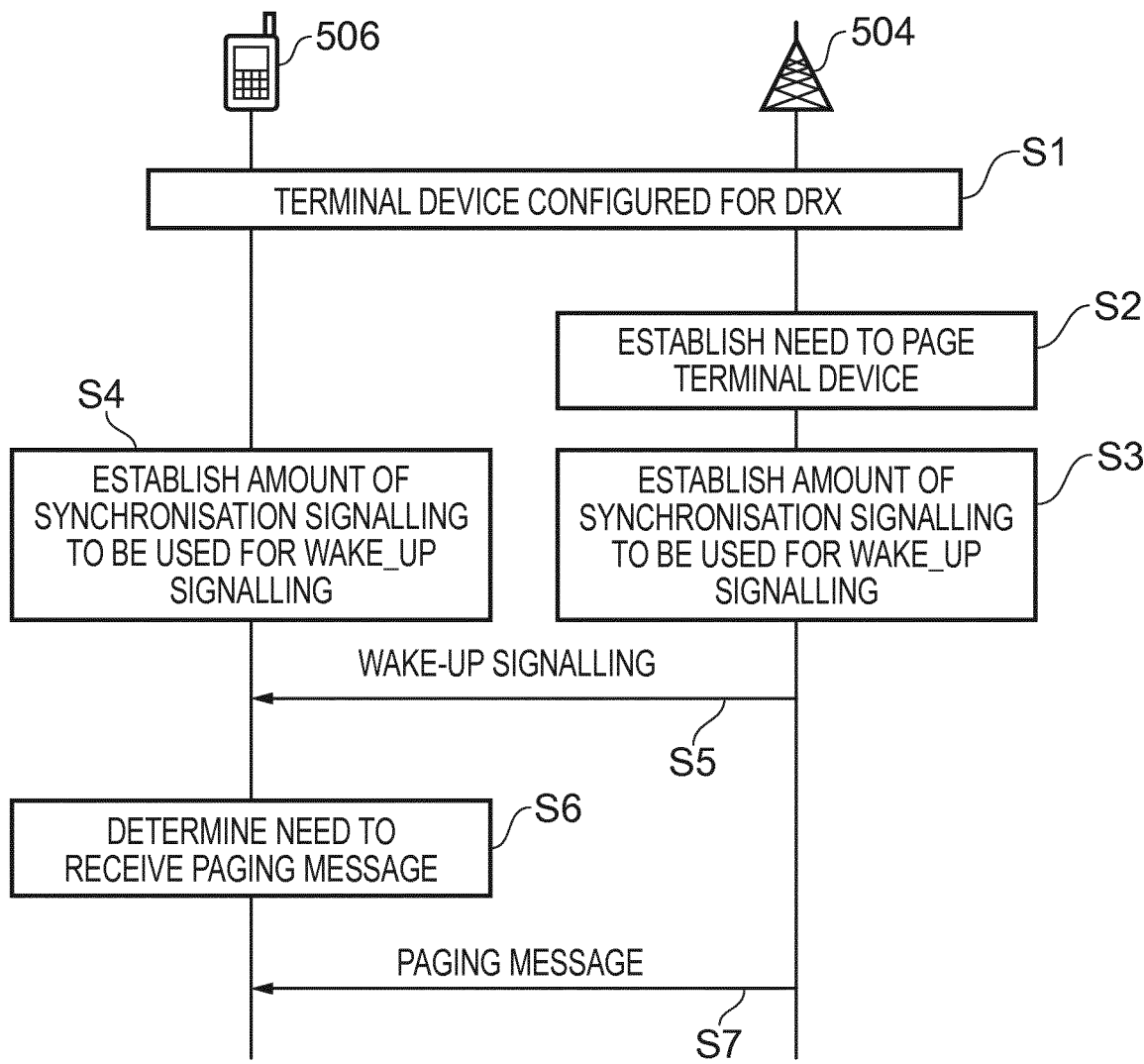
FIG. 7 is a signalling ladder diagrams schematically representing some operating aspects of wireless telecommunications systems in accordance with certain embodiments of the disclosure.

FIG. 7 is a ladder diagram schematically representing some operating aspects of the wireless telecommunications system 500 as discussed above with reference to FIG. 6 in accordance with certain embodiments of the disclosure. In particular, the diagram represents some operations and signalling exchange associated with the terminal device 506 and the network access node 504 in accordance with certain embodiments of the disclosure.

As schematically indicated in step S1, the terminal device 506 is configured for a discontinuous reception (DRX) mode of operation with the network access node 504 in a manner that uses wake up signalling to provide the terminal device with an indication of whether an upcoming paging occasion will include a paging message, which may be for the terminal device. This may be in accordance with previously proposed techniques, but modified in accordance with embodiments of the disclosure as discussed further herein. In addition, in step S1, the terminal device 506 may be configured for a discontinuous reception (DRX) mode of operation and for a certain coverage level of network access node 504.

In step S2 the network access mode establishes a need to page the terminal device. The reason why the terminal device is to be paged is not significant to the principles described herein. For example, the network access node may have received data that needs to be transmitted to the terminal device, or the network access node may determine that the terminal device should be triggered to transmit data to the network access mode.

In step S3 the network access node 504 establishes an amount of synchronisation signalling to be used for wake-up signalling to be transmitted to indicate to the terminal device the paging message is going to be sent. This step may be in accordance with the principles discussed above.

In step S4 the terminal device 506 also establishes the amount of synchronisation signalling to be used for any wake-up signalling (at this stage the terminal device does not know it will receive wake-up signalling). As noted above, it can be helpful in some implementations if the terminal device is aware of the amount of synchronisation signalling to be used in association with wake-up signalling addressed to the terminal device, although in principle the terminal device could instead be configured to blind decode for different amounts of synchronisation signalling.

In step S5 the network access node 504 transmits wake-up signalling to the terminal device, wherein the wake-up signalling comprises an indication of an identifier for the terminal device (or of a group of terminal devices to which the terminal device belongs) and the established amount of synchronisation signalling. The format for the wake-up signalling transmitted in step S5 may be based on previously proposed approaches, for example as represented in FIG. 5. The terminal device may thus use the synchronisation signalling associated with the wake-up signalling of step S5 to synchronise to the network to allow the wake-up signal to be detected generally in accordance with previously proposed techniques.

In step S6 the terminal device determines a need to receive a paging message at the next paging occasion based on the presence of an identifier for the terminal device/group of terminal devices to which the terminal device belongs in the wake-up signalling. Again, this may be based on previously proposed techniques.

In step S7, the network access node 504 transmits the paging message and the terminal device receives and decodes the paging message. Again, this may be performed in accordance with conventional techniques.

If the terminal device is unable to receive the wake-up signalling in step S5, or receives the wake-up signalling, but establishes the wake-up signalling does not include an identifier for the terminal device, the terminal device may return to DRX sleep mode without seeking to decode any paging message in the upcoming paging occasion, thereby saving power in accordance with the principles discussed above. As noted above, in some implementations, the WUS might not include any indication of any specific terminal device(s)/group(s) of terminal devices, but may instead simply include an indication of whether or not an upcoming paging occasion includes any paging message at all.

Figure 8:
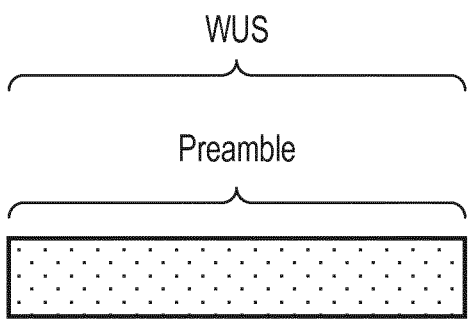
FIG. 8 schematically represents an example format for wake up signalling (WUS) that may be adapted for use in accordance with certain embodiments of the disclosure.

It will be appreciated there are many modifications that may be made to the approaches set out above in accordance with other embodiments of the disclosure. For example, the general format for the wake-up signalling may not conform to that shown in FIG. 5, but may have a different format. For example, the wake-up signalling may have a format such as shown in FIG. 8 in which the wake-up signalling comprises a preamble part without a separate information part, and instead, the preamble may itself contain an indication of the identity for the terminal device(s) for which the wake-up signalling indicates a paging message is to be subsequently transmitted.

Furthermore, while the above-described embodiments have primarily focused on wake-up signalling in respect of a paging message, similar principles can be applied in respect of other downlink signalling. For example, in a scenario in which a connected mode terminal device is configured for DRX operation, the terminal device will typically monitor PDCCH (or equivalent depending on the implementation) for allocations of resources on PDSCH (or equivalent depending on implementation) addressed to an identifier for the terminal device (for example a C-RNTI in an LTE context) during DRX wake periods. Wake-up signalling of the kind discussed above may be used to indicate to the terminal device whether or not an upcoming radio frame includes dedicated messaging for the terminal device, or whether the terminal device may return to sleep without needing to decode PDCCH. In this regard it will be appreciated the principles described above in respect of wake-up signalling for a paging message may be equally applied in respect of wake-up signalling for dedicated resource allocation messages (e.g. a message addressed to a terminal device that is radio resource connected rather than a general paging message).

Thus there has been described a method of operating a network access node in a wireless telecommunications system comprising the network access node and a terminal device, wherein the method comprises: establishing that a downlink message for the terminal device to decode is going to be transmitted by the network access node; and transmitting wake-up signalling to the terminal device in advance of transmitting the downlink message to provide the terminal device with an indication the downlink message for the terminal device to decode is going to be transmitted, wherein the wake-up signalling comprises an indication of an amount of synchronisation signalling for use by the terminal device to achieve radio synchronisation with the network access node, wherein the amount of synchronisation signalling depends on an amount of time elapsed since the terminal device was previously radio synchronised to the network access node.

It will be appreciated that while the present disclosure has in some respects focused on implementations in an LTE-based and/or 5G network for the sake of providing specific examples, the same principles can be applied to other wireless telecommunications systems. Thus, even though the terminology used herein is generally the same or similar to that of the LTE and 5G standards, the teachings are not limited to the present versions of LTE and 5G and could apply equally to any appropriate arrangement not based on LTE or 5G and/or compliant with any other future version of an LTE, 5G or other standard.

It may be noted various example approaches discussed herein may rely on information which is predetermined/predefined in the sense of being known by both the base station and the terminal device. It will be appreciated such predetermined/predefined information may in general be established, for example, by definition in an operating standard for the wireless telecommunication system, or in previously exchanged signalling between the base station and terminal devices, for example in system information signalling, or in association with radio resource control setup signalling. That is to say, the specific manner in which the relevant predefined information is established and shared between the various elements of the wireless telecommunications system is not of primary significance to the principles of operation described herein. It may further be noted various example approaches discussed herein rely on information which is exchanged/communicated between various elements of the wireless telecommunications system and it will be appreciated such communications may in general be made in accordance with conventional techniques, for example in terms of specific signalling protocols and the type of communication channel used, unless the context demands otherwise. That is to say, the specific manner in which the relevant information is exchanged between the various elements of the wireless telecommunications system is not of primary significance to the principles of operation described herein.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

Paragraph 1. A method of operating a network access node in a wireless telecommunications system comprising the network access node and a terminal device, wherein the method comprises: establishing that a downlink message for the terminal device to decode is going to be transmitted by the network access node; and transmitting wake-up signalling to the terminal device in advance of transmitting the downlink message to provide the terminal device with an indication the downlink message for the terminal device to decode is going to be transmitted, wherein the wake-up signalling comprises an amount of synchronisation signalling for use by the terminal device to achieve radio synchronisation with the network access node, wherein the amount of synchronisation signalling depends on an amount of time elapsed since the terminal device previously achieved radio synchronisation with the network access node.

Paragraph 2. The method of paragraph 1, wherein the downlink message comprises a paging message.

Paragraph 3. The method of paragraph 1 or 2, wherein the wake-up signalling further comprises an indication of an identifier for the terminal device.

Paragraph 4. The method of paragraph 3, wherein the indication of an identifier for the terminal device comprises an indication of an identifier for a group of terminal devices of which the terminal device is a member.

Paragraph 5. The method of any of paragraphs 1 to 4, wherein the terminal device is configured to operate in a discontinuous reception mode and the amount of time elapsed since the terminal device previously achieved radio synchronisation with the network access node is taken to correspond to an amount of time associated with a repeat period for the discontinuous reception mode.

Paragraph 6. The method of any of paragraphs 1 to 5, wherein the amount of time elapsed since the terminal device previously achieved radio synchronisation with the network access node is taken to correspond to an amount of time since the terminal device previously received data from the network access node on a downlink control channel and/or a downlink shared channel.

Paragraph 7. The method of any of paragraphs 1 to 6, wherein the amount of synchronisation signalling is a first amount if it is determined the amount of time elapsed since the terminal device previously achieved radio synchronisation with the network access node is less than a first threshold time period and the amount of synchronisation signalling is a second amount if it is determined the amount of time elapsed since the terminal device previously achieved radio synchronisation with the network access node is more than the first threshold time period, wherein the second amount is greater than the first amount.

Paragraph 8. The method of paragraph 7, wherein the first amount of synchronisation signalling is zero.

Paragraph 9. The method of paragraph 7 or 8, wherein the first threshold time period is configurable and the method further comprises the network access node conveying an indication of the first threshold time period to the terminal device.

Paragraph 10. The method of paragraph 9, wherein the indication of the first threshold time period is conveyed to the terminal device in association with prior system information signalling or radio resource control, RRC, signalling.

Paragraph 11. The method of any of paragraphs 7 or 8, wherein the first threshold time period is established from an operating standard for the wireless telecommunications system.

Paragraph 12. The method of any of paragraphs 7 to 11, wherein the amount of synchronisation signalling is a third amount if it is determined the amount of time elapsed since the terminal device previously achieved radio synchronisation with the network access node is more than a second threshold time period, wherein the second threshold time period is longer than the first threshold time period and the third amount is greater than the second amount.

Paragraph 13. The method of any of paragraphs 1 to 12, wherein the synchronisation signalling comprises a signature sequence and the amount of synchronisation signalling corresponds with a length of the signature sequence.

Paragraph 14. The method of any of paragraphs 1 to 13, wherein the amount of synchronisation signalling further depends on radio channel conditions between the network access node and the terminal device.

Paragraph 15. The method of paragraph 14, wherein the synchronisation signalling comprises a number of repeated transmissions of a signature sequence wherein the number of repeated transmissions is dependent on radio channel conditions.

Paragraph 16. The method of any of paragraphs 1 to 15, wherein the amount of synchronisation signalling further depends on a characteristic of a timing clock for the terminal device.

Paragraph 17. The method of any of paragraphs 1 to 16, further comprising transmitting the downlink message, wherein transmitting the downlink message comprises a first step of transmitting an indication of radio resources and a second step of transmitting information for the terminal device using the radio resources indicated in the first step.

Paragraph 18. A network access node for use in a wireless telecommunications system comprising the network access node and a terminal device, wherein the network access node comprises controller circuitry and transceiver circuitry configured to operate together such that the network access node is operable to: establish that a downlink message for the terminal device to decode is going to be transmitted by the network access node; and transmit wake-up signalling to the terminal device in advance of transmitting the downlink message to provide the terminal device with an indication the downlink message for the terminal device to decode is going to be transmitted, wherein the wake-up signalling comprises an amount of synchronisation signalling for use by the terminal device to achieve radio synchronisation with the network access node, wherein the amount of synchronisation signalling depends on an amount of time elapsed since the terminal device previously achieved radio synchronisation with the network access node.

Paragraph 19. Circuitry for a network access node for use in a wireless telecommunications system comprising the network access node and a terminal device, wherein the circuitry comprises controller circuitry and transceiver circuitry configured to operate together such that the circuitry is operable to: establish that a downlink message for the terminal device to decode is going to be transmitted by the network access node; and transmit wake-up signalling to the terminal device in advance of transmitting the downlink message to provide the terminal device with an indication the downlink message for the terminal device to decode is going to be transmitted, wherein the wake-up signalling comprises an amount of synchronisation signalling for use by the terminal device to achieve radio synchronisation with the network access node, wherein the amount of synchronisation signalling depends on an amount of time elapsed since the terminal device previously achieved radio synchronisation with the network access node.

Paragraph 20. A method of operating a terminal device in a wireless telecommunications system comprising the terminal device and a network access node, wherein the method comprises: receiving wake-up signalling transmitted to the terminal device by the network access node to provide the terminal device with an indication a downlink message for the terminal device to decode is going to be transmitted, wherein the wake-up signalling comprises an amount of synchronisation signalling for use by the terminal device to achieve radio synchronisation with the network access node, wherein the amount of synchronisation signalling depends on an amount of time elapsed since the terminal device previously achieved radio synchronisation with the network access node.

Paragraph 21. A terminal device for use in a wireless telecommunications system comprising the terminal device and a network access node, wherein the terminal device comprises controller circuitry and transceiver circuitry configured to operate together such that the terminal device is operable to: receive wake-up signalling transmitted to the terminal device by the network access node to provide the terminal device with an indication a downlink message for the terminal device to decode is going to be transmitted, wherein the wake-up signalling comprises an indication of an amount of synchronisation signalling for use by the terminal device to achieve radio synchronisation with the network access node, wherein the amount of synchronisation signalling depends on an amount of time elapsed since the terminal device previously achieved radio synchronisation with the network access node.

Paragraph 22. Circuitry for a terminal device for use in a wireless telecommunications system comprising the terminal device and a network access node, wherein the circuitry comprises controller circuitry and transceiver circuitry configured to operate together such that the circuitry is operable to: receive wake-up signalling transmitted to the terminal device by the network access node to provide the terminal device with an indication a downlink message for the terminal device to decode is going to be transmitted, wherein the wake-up signalling comprises an indication of an amount of synchronisation signalling for use by the terminal device to achieve radio synchronisation with the network access node, wherein the amount of synchronisation signalling depends on an amount of time elapsed since the terminal device previously achieved radio synchronisation with the network access node.

REFERENCES

[1] RP-161464, "Revised WID for Further Enhanced MTC for LTE," Ericsson, 3GPP TSG RAN Meeting #73, New Orleans, USA, Sep. 19-22, 2016
[2] RP-161901, "Revised work item proposal: Enhancements of NB-IoT", Huawei, HiSilicon, 3GPP TSG RAN Meeting #73, New Orleans, USA, Sep. 19-22, 2016
[3] RP-170732, "New WID on Even further enhanced MTC for LTE," Ericsson, Qualcomm, 3GPP TSG RAN Meeting #75, Dubrovnik, Croatia, Mar. 6-9, 2017
[4] RP-170852, "New WID on Further NB-IoT enhancements," Huawei, HiSilicon, Neul, 3GPP TSG RAN Meeting #75, Dubrovnik, Croatia, Mar. 6-9, 2017
[5] Holma H. and Toskala A, "LTE for UMTS OFDMA and SC-FDMA based radio access", John Wiley and Sons, 2009
[6] 3GPP TS 36.304 version 14.2.0 Release 14
[7] 3GPP TS 36.321 version 13.5.0 Release 13
[8] C. Hambeck, et al., "A 2.4 µW Wake-up Receiver for wireless sensor nodes with −71 dBm sensitivity", in IEEE Proceeding International Symposium of Circuits and Systems (ISCAS), 2011, pp. 534-537.
[9] N. S. Mazloum, O. Edfors, "Performance Analysis and Energy Optimization of Wake-Up Receiver Schemes for Wireless Low-Power Applications", IEEE Transaction on Wireless Communications, December 2014

The invention claimed is:

1. A method of operating a network access node in a wireless telecommunications system comprising the network access node and a terminal device, wherein the method comprises:
  establishing that a downlink message for the terminal device to decode is going to be transmitted by the network access node; and
  transmitting wake-up signaling to the terminal device in advance of transmitting the downlink message to provide the terminal device with an indication the downlink message for the terminal device to decode is going to be transmitted,
  wherein the wake-up signaling comprises an amount of synchronization signaling for use by the terminal device to achieve radio synchronization with the network access node,
  wherein the amount of synchronization signaling depends on an amount of time elapsed since the terminal device previously achieved radio synchronization with the network access node,
  wherein the amount of synchronization signaling is a first amount under a first determination that the amount of time elapsed since the terminal device previously achieved radio synchronization with the network access node is less than a first threshold time period, and
  wherein the amount of synchronization signaling is a second amount under a second determination that the amount of time elapsed since the terminal device previously achieved radio synchronization with the network access node is more than the first threshold time period, wherein the second amount is greater than the first amount.

2. The method of claim 1, wherein the downlink message comprises a paging message.

3. The method of claim 1, wherein the wake-up signaling further comprises an indication of an identifier for the terminal device.

4. The method of claim 3, wherein the indication of the identifier for the terminal device comprises an indication of an identifier for a group of terminal devices of which the terminal device is a member.

5. The method of claim 1, wherein the terminal device is configured to operate in a discontinuous reception mode and the amount of time elapsed since the terminal device previously achieved radio synchronization with the network access node is taken to correspond to an amount of time associated with a repeat period for the discontinuous reception mode.

6. The method of claim 1, wherein the amount of time elapsed since the terminal device previously achieved radio synchronization with the network access node is taken to correspond to an amount of time since the terminal device previously received data from the network access node on a downlink control channel and/or a downlink shared channel.

7. The method of claim 1, wherein the first amount of synchronization signaling is zero.

8. The method of claim 1, wherein the first threshold time period is configurable and the method further comprises the network access node conveying an indication of the first threshold time period to the terminal device.

9. The method of claim 8, wherein the indication of the first threshold time period is conveyed to the terminal device in association with prior system information signaling or radio resource control, RRC signaling.

10. The method of claim 1, wherein the first threshold time period is established from an operating standard for the wireless telecommunications system.

11. The method of claim 1, wherein the amount of synchronization signaling is a third amount if it is determined the amount of time elapsed since the terminal device previously achieved radio synchronization with the network access node is more than a second threshold time period, wherein the second threshold time period is longer than the first threshold time period and the third amount is greater than the second amount.

12. The method of claim 1, wherein the synchronization signaling comprises a signature sequence and the amount of synchronization signaling corresponds with a length of the signature sequence.

13. The method of claim 1, wherein the amount of synchronization signaling further depends on radio channel conditions between the network access node and the terminal device.

14. The method of claim 13, wherein the synchronization signaling comprises a number of repeated transmissions of a signature sequence wherein the number of repeated transmissions is dependent on radio channel conditions.

15. The method of claim 1, wherein the amount of synchronization signaling further depends on a characteristic of a timing clock for the terminal device.

16. The method of claim 1, further comprising transmitting the downlink message, wherein transmitting the downlink message comprises a first step of transmitting an indication of radio resources and a second step of transmitting information for the terminal device using the radio resources indicated in the first step.

17. A network access node for use in a wireless telecommunications system comprising the network access node and a terminal device, wherein the network access node comprises controller circuitry and transceiver circuitry configured to operate together such that the network access node is operable to:

establish that a downlink message for the terminal device to decode is going to be transmitted by the network access node;

select an amount of synchronization signaling from among a plurality of predetermined amounts of synchronization signaling for use by the terminal device to achieve radio synchronization with the network access node; and transmit wake-up signaling to the terminal device in advance of transmitting the downlink message to provide the terminal device with an indication the downlink message for the terminal device to decode is going to be transmitted, wherein the wake-up signaling comprises the amount of synchronization signaling for use by the terminal device to achieve radio synchronization with the network access node, wherein the selected amount of synchronization signaling from among the plurality of predetermined amounts of synchronization signaling is selected based on an amount of time elapsed since the terminal device previously achieved radio synchronization with the network access node.

18. A terminal device for use in a wireless telecommunications system comprising the terminal device and a network access node, wherein the terminal device comprises controller circuitry and transceiver circuitry configured to operate together such that the terminal device is operable to:

determine an amount of synchronization to be transmitted with wake-up signaling transmitted to the terminal device based on a plurality of discontinuous reception mode (DRX) thresholds received from the network access node prior to receipt of the wake-up signaling and an amount of time elapsed since the terminal device previously achieved radio synchronization with the network access node, the plurality of discontinuous reception mode (DRX) thresholds being associated with respective different amounts of synchronization signaling, and receive the wake-up signaling transmitted to the terminal device by the network access node to provide the terminal device with an indication a downlink message for the terminal device to decode is going to be transmitted, the wake-up signaling comprising an indication of the amount of synchronization signaling for use by the terminal device to achieve radio synchronization with the network access node, wherein the amount of synchronization signaling depends on the amount of time elapsed since the terminal device previously achieved radio synchronization with the network access node.

* * * * *